P. EMBREE.
Churn.
No. 27,536.
Patented March 20, 1860.
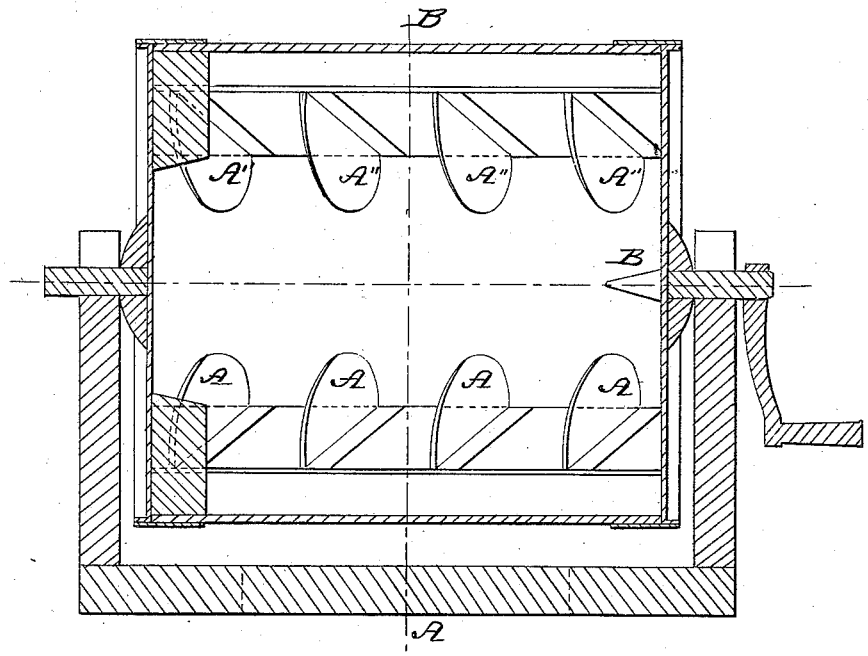
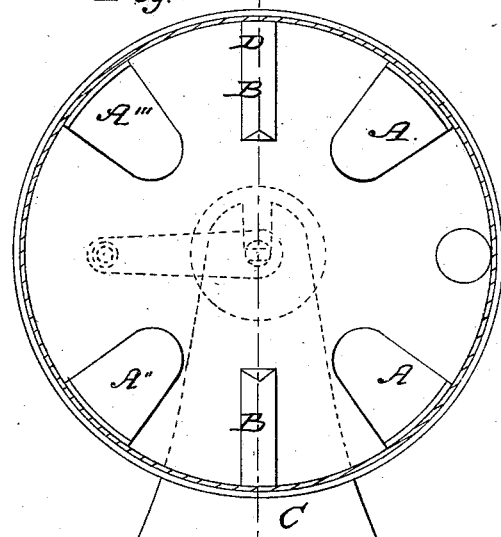
Fig. 2
Witnesses
P. J. Munn Child
Geo. Alfred Townsend
Inventor
Pearson Embree

UNITED STATES PATENT OFFICE.

PEARSON EMBREE, OF WEST CHESTER, PENNSYLVANIA.

CHURN.

Specification of Letters Patent No. 27,536, dated March 20, 1860.

*To all whom it may concern:*

Be it known that I, PEARSON EMBREE, of West Chester, Chester county, in the State of Pennsylvania, have made a new and useful Improvement in Churns; and I do hereby declare the following to be a full, clear, and exact description of the same, reference being had to the annexed drawings, in which—

Figure 1, is a longitudinal section of the churn. Fig. 2 is a cross section of the same.

The nature of my invention consists in placing a series of slats or projections upon the inner surface of a common round or barrel churn so arranged that each row shall point obliquely in the line of motion of the churn, each row pointing in the opposite direction from the preceding row.

In the drawing A A A A A′ A′ A′ A′ A″ A″ A″ A″ A‴ A‴ A‴ A‴ are the slats. B B are projections placed upon the head of the churn. These slats A A A, etc., are generally made of wood, and are about equal in height to one-fourth the diameter of the churn. For convenience they may be rounded upon their ends but this is not absolutely necessary.

The operation of this churn is as follows: The slats A A A, etc., throw the cream toward an end of the churn (one portion of the slats throwing to one end and the remaining portion to the other end); as the cream is thrown violently toward the end it either strikes other slats, or the projections B B by either of which means its course is reversed and great agitation of the cream produced. Butter is thus produced by these means in much less time than by the ordinary revolving churns.

Having thus described my improvement what I claim as my invention and desire to secure by Letters Patent is—

The employment in a churn of a series of slats or projections attached to the inner surface and so arranged that each row shall point obliquely in the line of motion of the churn and the slats in each successive row point in opposite directions substantially as described.

PEARSON EMBREE.

Witnesses:
J. G. MINI CHILD,
GEO. ALFRED TOUNSEND.